US009334890B2

(12) United States Patent
Rs et al.

(10) Patent No.: US 9,334,890 B2
(45) Date of Patent: May 10, 2016

(54) HARDMETAL ROLL CLAMPING SYSTEM ONTO THE SHAFT AND THE METHOD THEREOF

(71) Applicant: KENNAMETAL INDIA LIMITED, Bangalore (IN)

(72) Inventors: Ravishankar Rs, Bangalore (IN); Raghu Kuppalli Venkataramu, Bangalore (IN); Suresh Kamath Purushottam, Bangalore (IN); Sanjay Kumar, Dist-Hanumangarh (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 506 days.

(21) Appl. No.: 13/742,135

(22) Filed: Jan. 15, 2013

(65) Prior Publication Data

US 2013/0199022 A1    Aug. 8, 2013

(30) Foreign Application Priority Data

Jan. 24, 2012    (IN) .............................. 287/CHE/2012

(51) Int. Cl.
| | | |
|---|---|---|
| *B25G 3/20* | (2006.01) | |
| *F16B 2/14* | (2006.01) | |
| *F16B 2/18* | (2006.01) | |
| *F16B 7/04* | (2006.01) | |

(52) U.S. Cl.
CPC ................. *F16B 7/0406* (2013.01); *F16B 7/04* (2013.01); *Y10T 29/49948* (2015.01); *Y10T 403/7069* (2015.01)

(58) Field of Classification Search
CPC ............ Y10T 403/645; Y10T 403/648; Y10T 403/69; Y10T 403/7062; Y10T 403/7064; Y10T 403/7066; Y10T 403/7067; Y10T 403/7069; F16B 7/04; F16B 7/0406; B21B 35/14; B21B 35/141; B21B 31/02; B21B 31/07; F16C 35/063
USPC ........ 403/337, 338, 373, 374.1, 374.2, 374.4; 72/237, 249
See application file for complete search history.

(56) References Cited

U.S. PATENT DOCUMENTS

| | | | | |
|---|---|---|---|---|
| 2,634,178 | A | * | 4/1953 | Chievitz ........................ 384/583 |
| 3,080,199 | A | * | 3/1963 | Rickley ......................... 384/584 |
| 3,168,325 | A | * | 2/1965 | Chittenden ..................... 279/51 |
| 3,535,008 | A | * | 10/1970 | Buta .............................. 384/540 |
| 3,616,671 | A | | 11/1971 | Notari |
| 3,782,796 | A | * | 1/1974 | Rickley et al. ................ 384/584 |
| 3,902,233 | A | | 9/1975 | Ohtsu |

(Continued)

*Primary Examiner* — Gregory Binda
*Assistant Examiner* — Nahid Amiri
(74) *Attorney, Agent, or Firm* — Larry R. Meenan

(57) ABSTRACT

A clamping system for securing hardmetal rolls includes a shaft having a groove, one or more clamping nuts having threads on the inner circumference which are mounted around the pressure ring having threads on the outer circumference by threading mechanism, pair of split clamps having wedge provided on the inner circumference of the split clamps and is accommodated in the groove provided on the shaft fixed to the pressure ring and acts as the bearing member of the mechanism to sustain the axial load applied by the screws. Plurality of screws passing through plurality of threaded holes provided on front face of the split clamps to prevent rotation of the hardmetal rolls. Plurality of locating pins are passed through the through holes provided at the mating face of the wedge of the split clamps to restrict radial movement of the split clamps and are used to fix the split clamps.

6 Claims, 5 Drawing Sheets

(56) References Cited

U.S. PATENT DOCUMENTS

| | | | |
|---|---|---|---|
| 4,086,946 A * | 5/1978 | Keen | 411/279 |
| 4,105,264 A | 8/1978 | Zimmermann et al. | |
| 4,136,989 A * | 1/1979 | Bianco | 403/261 |
| 4,186,629 A * | 2/1980 | Costes | 81/52 |
| 4,208,147 A | 6/1980 | Giege et al. | |
| 4,660,268 A | 4/1987 | Evans | |
| 4,747,291 A | 5/1988 | Kostopolos | |
| 4,781,052 A | 11/1988 | Schiller | |
| 4,841,612 A | 6/1989 | Kark | |
| 4,932,111 A | 6/1990 | Kark | |
| 5,029,461 A | 7/1991 | Lawrence et al. | |
| 5,040,398 A | 8/1991 | Nakagawa et al. | |
| 5,154,518 A * | 10/1992 | Goforth, Jr. | 384/584 |
| 5,257,965 A | 11/1993 | Fuchs et al. | |
| 5,700,233 A | 12/1997 | Fabris | |
| 5,775,709 A * | 7/1998 | Chen | 280/279 |
| 5,782,125 A | 7/1998 | Faggiani et al. | |
| 5,800,088 A | 9/1998 | Lueckhof et al. | |
| 6,132,101 A | 10/2000 | Landy, III | |
| 6,394,464 B1 * | 5/2002 | Moreau | 277/603 |
| 6,666,804 B2 | 12/2003 | Fabris | |
| 6,685,611 B1 | 2/2004 | Kark | |
| 6,824,471 B2 * | 11/2004 | Kamenov | 464/182 |
| 6,892,562 B2 | 5/2005 | Gethings | |
| 7,010,952 B2 | 3/2006 | Hofmann et al. | |
| 7,082,801 B2 | 8/2006 | Di Giacomo | |
| 7,386,939 B2 | 6/2008 | Di Giacomo | |
| 7,572,215 B2 | 8/2009 | Kayhan et al. | |
| 7,582,046 B2 | 9/2009 | Kayhan et al. | |
| 7,621,388 B2 | 11/2009 | Vlk et al. | |
| 7,901,751 B2 | 3/2011 | Di Nardo et al. | |
| 8,151,465 B2 * | 4/2012 | Hewitt | 29/898.07 |
| 8,746,984 B2 * | 6/2014 | Putt et al. | 384/537 |
| 2006/0287176 A1 | 12/2006 | Gleizer et al. | |
| 2009/0280972 A1 | 11/2009 | Ogura et al. | |

* cited by examiner

HARDMETAL ROLL CLAMPING SYSTEM ONTO THE SHAFT AND THE METHOD THEREOF

CROSS-REFERENCE TO RELATED APPLICATION

This application claims the benefit of Indian Application Number 287/CHE/2012 filed Jan. 24, 2012, which is hereby fully incorporated herein by reference.

BACKGROUND OF THE INVENTION

The following specification particularly describes the nature of the invention and the manner in which it is to be performed.

The present disclosure relates to a clamping system of a rolling process using Hardmetal rolls, more particularly relates to a clamping system used onto a shaft used in rolling mills.

Conventional methods adopt the threads provided on the shaft to absorb the reaction load due to axial thrust generated while clamping. Threads are stress raisers which can lead to shaft failure or there is always a possibility of threads getting jammed because of long usage.

Conventionally, the rolls mounted on the shaft are clamped by applying axial load, which is applied either mechanically by number of equi-spaced screws or by hydraulic pressure. The counter load or the reaction load exerted while clamping is taken by the threads provided on the shaft.

The present axial clamping mechanisms use threaded ring which are secured on the shaft's complementary threads. The Rolls operate at a high temperature, corrosive atmosphere and at high operating loads. This results in damaged threads on the shafts due to corrosion and high stress. This may lead to the seizure of clamping mechanism and render the shaft useless.

One way of clamping mechanism is illustrated in FIG. 1. The threaded ring has inner circumferential threads which are secured onto the shaft by means of complementary threads provided on the shaft. The axial load is applied using screws mounted on the threaded ring. The gap provided between the threaded ring and the roll is utilized for tightening and loosening the screws. During operation of rolling, the threads on the shaft and the threaded ring may get jammed which in turn damages the shaft leading to failure as the threads act as stress raisers. Both the above mentioned points may lead to scrap the whole shaft assembly & damage the Hardmetal rolls.

SUMMARY OF THE INVENTION

The shortcomings of the prior art are overcome and additional advantages are provided through the provision as claimed in the present disclosure. Additional features and advantages are realized through the techniques of the present disclosure. Other embodiments and aspects of the disclosure are described in detail herein and are considered a part of the claimed disclosure.

In an embodiment of the disclosure, a clamping mechanism for securing a Hardmetal roll onto a shaft is described. The clamping mechanism comprises one or more clamping nuts placed around the Pressure ring. The clamping nuts are fixed to the Pressure ring by suitable threading means. A pair of split clamps is mounted onto the groove of the shaft such that a wedge provided in the inner circumference of the split clamps is accommodated in the groove acting as the bearing member and restrain axial movement of the split clamps during operation of the shaft. Plurality of screws are passed through plurality of threaded holes provided on the front face of the split clamps wherein, the screws apply axial force on the Hardmetal roll and prevents slippage during operation of the shaft. Pair of locating pins passing through one or more through holes provided at the wedge end of the split clamps to restrict the radial movement of the split clamps.

A method of assembling a clamping mechanism is provided as another aspect of the present disclosure. The method comprises, placing one or more clamping nuts around the pressure ring and fixing the clamping nuts by threaded means. A pair of split clamps is mounted onto the groove which is provided on the shaft such that the wedge exactly fits onto the shaft. Plurality of screws are passed through plurality of holes provided on the front face of the split clamps and fixing the split clamps together around the shaft by using plurality of Locating pins.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
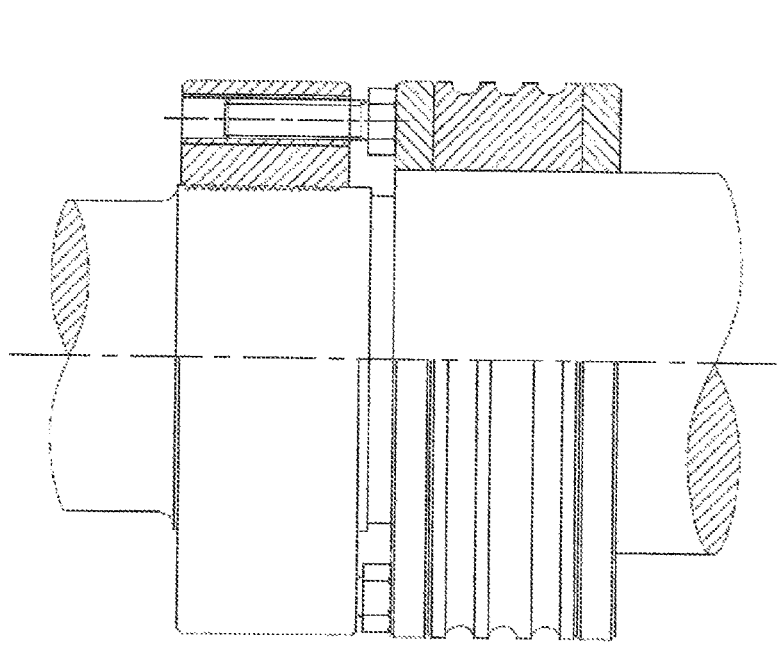
FIG. 1 shows side sectional view of shaft having threads on the shaft for threading the hardmetal roll according to the prior art.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Referring now to the drawings wherein the drawings are for the purpose of illustrating an exemplary embodiment of the disclosure only, and not for the purpose of limiting the same.

Figures 2, 2A:
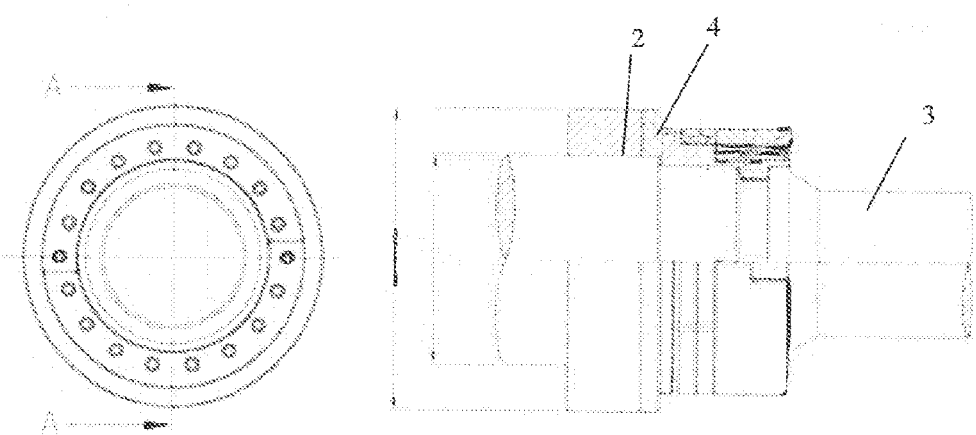
FIGS. 2 and 2A show a cut sectional view of the shaft having grooves on the shaft with split clamps, clamping nuts and pressure ring in place and secured by screws according to the disclosure.

FIGS. 2 and 2A are an exemplary embodiment of the disclosure and illustrate a cut sectional view of the shaft (3) having a groove (6). The shaft (3) has wedge shaped groove (6) to accommodate the wedges (7) provided on the inner circumference of the split clamps (5). The shape of the wedge (7) may vary depending on the requirement and accordingly the shape of the groove varies to house the wedge. The shape of the wedge and corresponding groove includes but is not limiting to square, rectangular, and trapezoidal. The pressure ring (2) is mounted onto the shaft (3) and secured using clamping nuts (4). The split clamps (5) are accommodated in the groove (6) provided on the shaft (3) and secured using Locating pins (10). Plurality of screws (8) are passed through the threaded holes (9) provided on the front face of the split clamps (5) to generate axial load.

Figure 3:
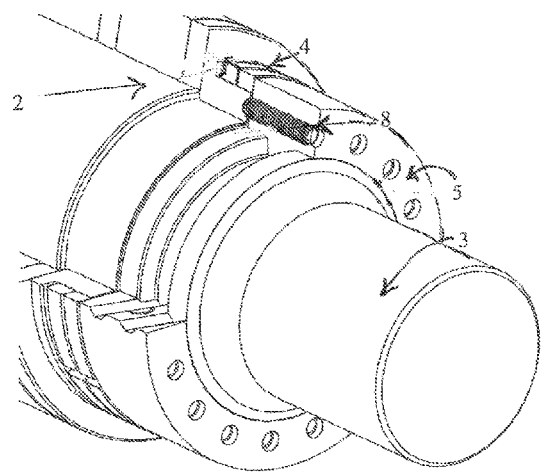
FIG. 3 shows cut sectional front perspective view of the shaft with screws applying axial force according to the disclosure.
Figure 4:
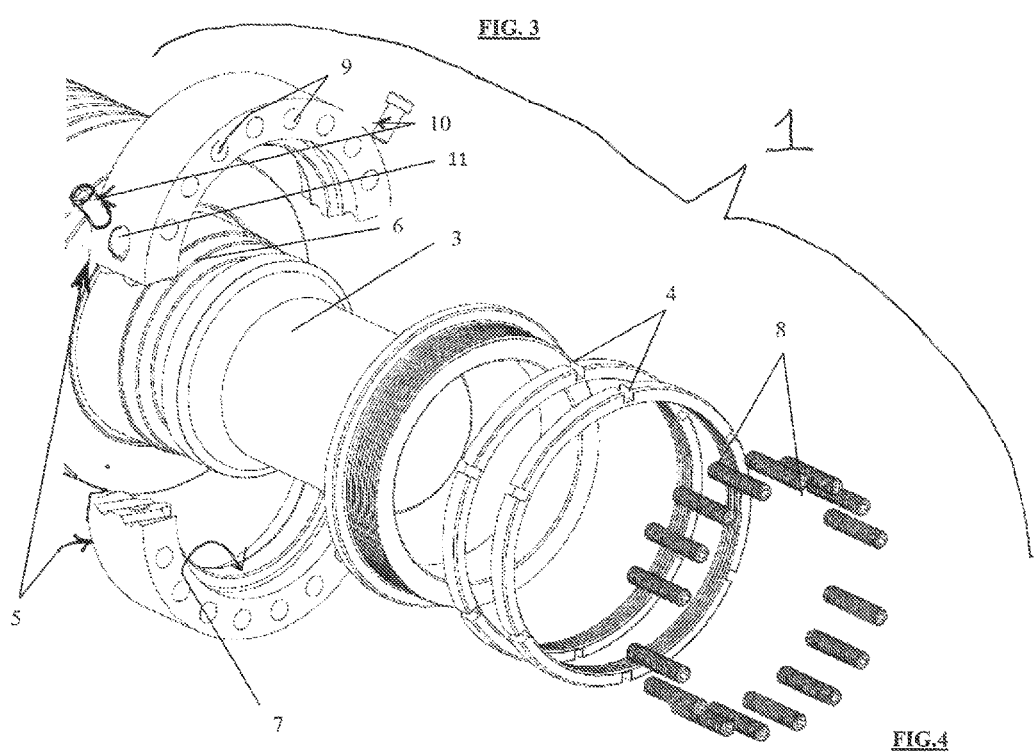
FIG. 4 shows exploded view of the clamping mechanism of the present disclosure.

During rolling operation, when the material passes between the Hardmetal rolls, high torque on the hardmetal rolls tends to slip the rolls over the shaft (3). The Split clamp (5) having wedge on its inner circumference acts as the bearing member. The axial load is generated by the plurality of screws (8) inserted into the threaded holes (9) on the face of the split clamps (5) as illustrated in FIGS. 3 and 4. The clamping nuts (4) having internal threads are assembled onto the Pressure ring (2) to ensure that the generated axial load is not disturbed during operation of the rolling. Further, plurality of Locating pins (10) are inserted into through holes (11) provided on the front face of the split clamps (5) for securing the pair of split clamps (5) in place and to prevent the radial movement of the split clamps (5) during the rolling operation.

Figure 5:
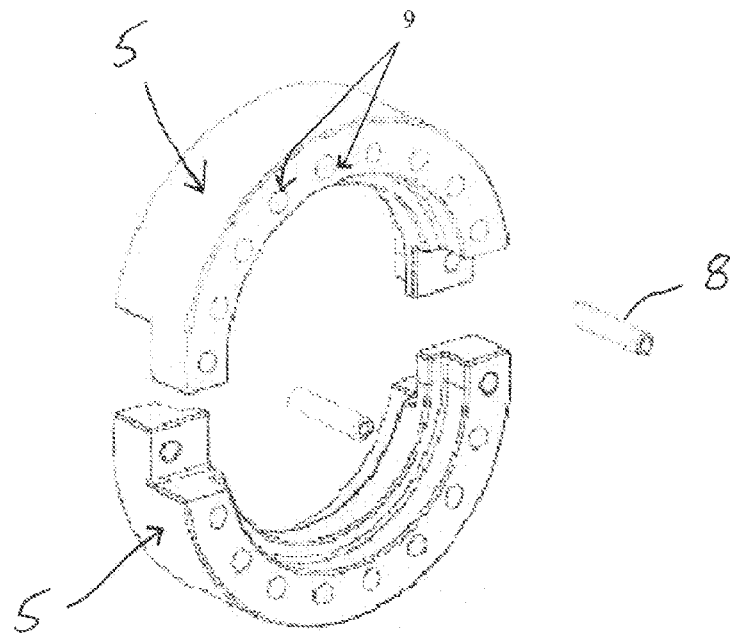
FIG. 5 shows front perspective view of the split clamps having a wedge on the inner circumference of the split clamps according to one embodiment of disclosure.
Figure 6:
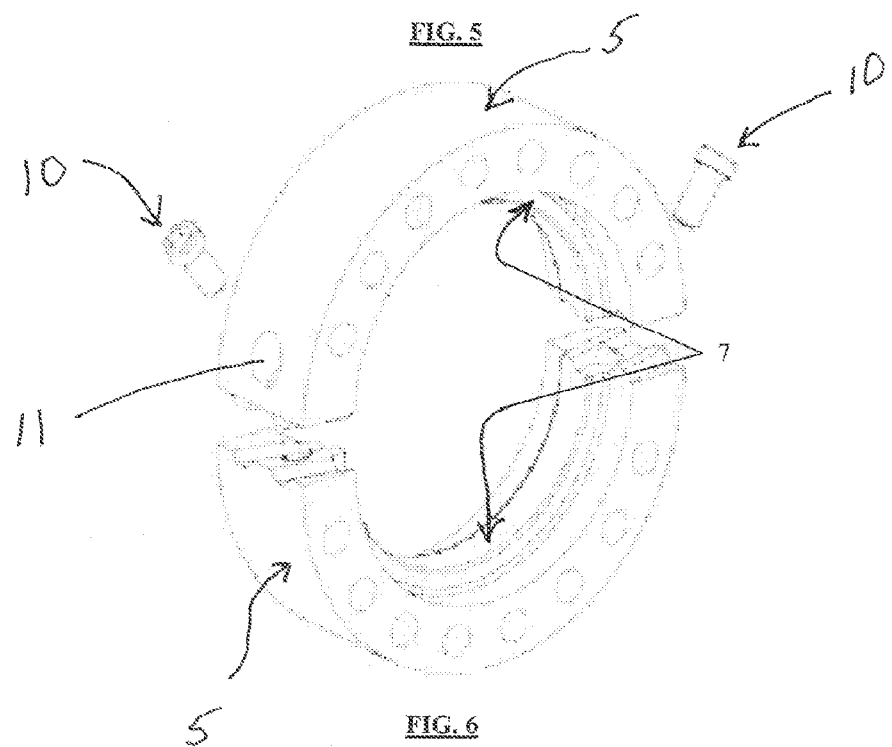
FIG. 6 shows front perspective view of the split clamps having trapezoidal ridges running at an angle on the mating faces according to one embodiment of disclosure.
Figure 7:
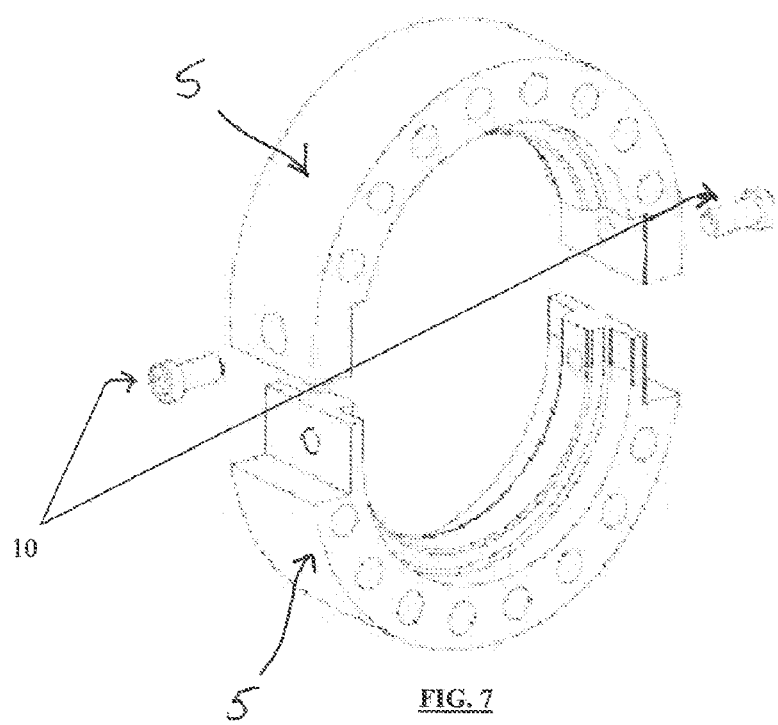
FIG. 7 shows front perspective view of the split clamps having stepped face on the circumferential face according to one embodiment of disclosure.

FIGS. 5, 6 & 7 are exemplary embodiments of the disclosure and illustrate front perspective view of the split clamps (5). The split clamps (5) can be provided with mating ends in stepped wedges (FIG. 5), trapezoidal ridges (FIG. 6) and stepped faces (FIG. 7). The trapezoidal ridges runs at an angle on the mating ends of the split clamps (5) to restrict the axial movement of the wedges (7) and a high tensile screw is provided to secure the split clamps (5) radially. The pair of split clamps (5) are fixed together using plurality of Locating pins (10) to restrict the radial movement of the split clamps (5).

In another embodiment of the disclosure front perspective view of the split clamps (5) having stepped face on the circumferential face are shown in FIG. 7 which are secured in place by a screw diametrically opposite to each other.

Figure 8:
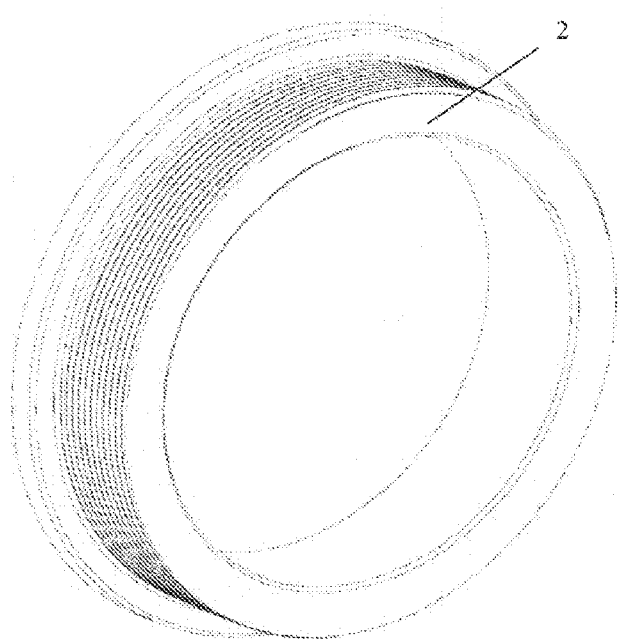
FIG. 8 shows front perspective view of the pressure ring having threads on the outer circumference according to the disclosure.

FIG. 8 is an exemplary embodiment of the disclosure and illustrates front perspective view of the pressure ring (2) having threads on the outer circumference. The pressure ring (2) is placed around the shaft (3) and has threads on its outer circumference. The threads provided on the outer circumference helps in threading the clamping nut (4) onto the pressure ring (2).

Figure 9:
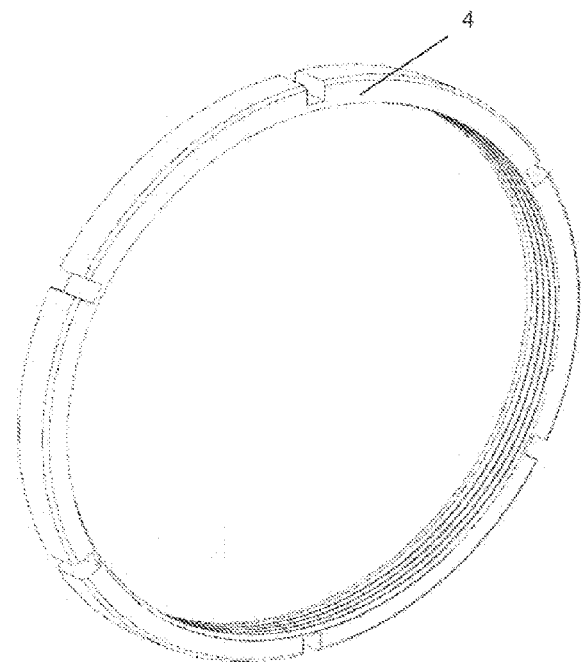
FIG. 9 shows front perspective view of the clamping nut having threads on the inner circumference according to the disclosure.

FIG. 9 is an exemplary embodiment of the disclosure and illustrates front perspective view of the clamping nut (4) having threads on its inner circumference to assemble the clamping nut (4) onto the pressure ring (2). The clamping nuts (4) have fine pitch internal threads which screw onto the threaded pressure ring (2). The clamping nuts (4) prevent the disturbances which affect the axial load force during operation and secure the pressure ring (2) and the axial load applied by the screws (8) stays intact.

Figure 10:
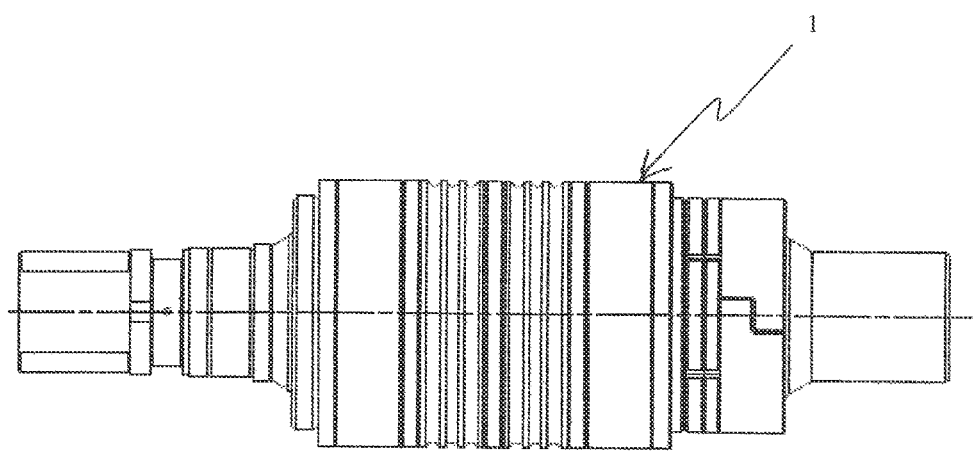
FIG. 10 shows side view of assembled clamping mechanism of the present disclosure according to the disclosure.

FIG. 10 is an exemplary embodiment of the disclosure and illustrates side view of assembled clamping device (1) of the present disclosure. The pressure ring (2) mounted around the shaft (3) over which two clamping nuts (4) are threaded onto the pressure ring (2). Pair of split clamps (5) are mounted onto the groove (6) provided on the shaft (3) secured by plurality of locating pins (10) and axial load is applied by plurality of screws (8) passed through the threaded holes (9) provided on the front face of the split clamps (5).

| | |
|---|---|
| Clamping device Assembly | 1 |
| Pressure ring | 2 |
| Shaft | 3 |
| Clamping Nuts | 4 |
| Split Clamps | 5 |
| Groove | 6 |
| Wedge | 7 |
| Screws | 8 |
| Threaded Holes | 9 |
| Locating Pins | 10 |
| Locating pins through Holes | 11 |

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A clamping system for securing a hardmetal roll, comprising:
    a shaft for receiving the hardmetal roll, the shaft having a groove formed therein;
    one or more clamping nuts having threads on an inner circumference are mounted around a pressure ring having threads on an outer circumference;
    a pair of split clamps having a wedge provided on the inner circumference of the split clamps and the wedge is accommodated in the groove provided on the shaft to restrain axial movement of the split clamps, wherein the pair of split clamps include mating end faces;
    a plurality of screws passing through a plurality of threaded holes provided on a front face of the split clamps to apply axial load; and
    a plurality of locating pins passing through through holes provided at the mating end faces of the wedge of the split clamps to restrict radial movement of the split clamps.

2. The clamping system as claimed in claim 1, wherein the split clamps are in circular shape.

3. The clamping system as claimed in claim 1, wherein the mating end faces of the split clamps have shapes selected from a group consisting of wedge shape, trapezoidal shape and ridge shape.

4. The clamping system as claimed in claim 1, wherein the shape of the groove provided on the shaft matches with the shape of the wedge provided on the inner circumference of the split clamps.

5. The clamping system as claimed in claim 1, wherein the shape of the wedge is trapezoidal shape.

6. The clamping system as claimed in claim 1, wherein the locating pins are selected from at least one of screws and dowel pins.

* * * * *